United States Patent
Moulton

[11] 3,890,617
[45] June 17, 1975

[54] LOGARITHMIC MONOPULSE RECEIVER

[75] Inventor: James A. Moulton, Santa Ana, Calif.

[73] Assignee: Rockwell International Corporation, El Segundo, Calif.

[22] Filed: Feb. 6, 1968

[21] Appl. No.: 703,381

[52] U.S. Cl. .............................. 343/7 A; 343/16 M
[51] Int. Cl.² .................................. G01S 9/22
[58] Field of Search ..................... 343/16 M, 7 A

[56] References Cited
UNITED STATES PATENTS

| | | | |
|---|---|---|---|
| 3,064,252 | 11/1962 | Varela ................................. | 343/16 |
| 3,212,089 | 10/1965 | Longacre et al. .................... | 343/16 |
| 3,618,093 | 11/1971 | Dickey ............................... | 343/16 M X |
| 3,720,941 | 3/1973 | Arcs .................................. | 343/7 A |

Primary Examiner—T. H. Tubbesing
Attorney, Agent, or Firm—L. Lee Humphries; H. Fredrick Hamann; Rolf M. Pitts

[57] ABSTRACT

A logarithmic monopulse receiver advantageously adapted for gating the receiver signals to avoid anomalies in a target angle signal output. A first and second intermediate frequency signalling channel is arranged to provide a respective first and second intermediate frequency output indicative of the respective logarithmic vector sum and difference of a monopulse sum and difference signal. A unipolar gating signal is provided by video detection of the IF vector difference signal. A further gating signal is provided by the IF vector sum signal.

6 Claims, 8 Drawing Figures

INVENTOR.
JAMES A. MOULTON

INVENTOR.
JAMES A. MOULTON

ATTORNEY

LOGARITHMIC MONOPULSE RECEIVER

The invention herein described was made in the course of or under a contract or subcontract thereunder with the U.S. Air Force.

CROSS-REFERENCES TO RELATED APPLICATIONS

1. U.S. application Ser. No. 221,653, filed Aug. 29, 1962, by James A. Moulton for Monopulse Receiver, now U.S. Pat. No. 3,740.750.

BACKGROUND OF THE INVENTION

Monopulse systems for measuring the target angle or angle-off-boresight of a detected target (situated within the antenna beamwidth) in a given plane containing the antenna boresight axis or a radiation axis of symmetry, employ an antenna having at least two feedhorns to provide two received signals. Also employed are conventional sum-and-difference monopulse receivers responsive to the sum of and the difference between the two received signals to provide a target angle signal indicative of the angle of a detected target off the antenna boresight axis. The sum signal itself is ordinarily used for target display purposes.

In the design of such monopulse receiver systems, the aperture of a prior art conventional antenna may have a rectangular shape which provides a uniform field distribution across the aperture. Such rectangular aperture normally has a substantial associated side-lobe pattern or response. Antennas having such antenna side-lobe response or radiation patterns provide illumination of targets lying within such side-lobes; and are, therefore, sensitive to energy reflected from such illuminated targets. Further, such a rectangular aperture normally provides more than a single null in the response of the difference signal as a function of target angle-off-boresight, thereby producing certain anomalies in the determination of the target-off boresight from such signal. For example, the detection of a target lying within the side-lobe response of an antenna may result in the generation of target angle signals falsely indicating a target angle-off-boresight lying within the angular width of the antenna main lobe response.

A discussion of such ambiguities, together with one means of attempting to reduce such ambiguities in the monopulse technique for measuring target angle-off-boresight, is described in U.S. Pat. No. 3,283,322 issued Nov. 1, 1967, to R. E. Hovda et al for Monopulse Receiver Apparatus. Such means comprises shaping the amplitude distribution or combined aperture field distribution from a conventional rectangular shape to achieve a gabled amplitude distribution. Such gabled amplitude aperture distribution is achieved by physically shaping the frontal area of an antenna reflector or physically shaping of the antenna feedhorn apertures or correcting the dipole elements of a flat plate monopulse antenna. A second and alternative method of reducing the ambiguities in the monopulse difference signal is to provide a preselectively controlled phase distribution across the antenna aperture, as taught and described in U.S. Pat. No. 3,355,738 issued Nov. 28, 1967, to J. A. Algeo for Microwave Antenna Having A Controlled Phase Distribution.

The above-described techniques for controlling the antenna aperture distribution are merely intended to provide monopulse antenna signals of a form which may be effectively gated or processed by a receiver-processor, so as to avoid "false-alarms" or the presentation of ambiguous target information to a display indicator. Such receiver-processor is generally required to perform two functions: (1) signal normalization, so as to reduce system sensitivity to changes in range and reflectivity and like factors affecting the strength of the target echoes received by the antenna, as is well understood in the art; and (2) signal-gating to avoid producing a receiver output in response to anomalies or ambiguous signals.

In the past, automatic gain-control-type intermediate frequency amplifiers have been employed for such normalization function, as indicated by above-described U.S. Pat. No. 3,283,322. Alternatively, intermediate frequency logarithmic amplifier stages have been utilized as indicated in my copending U.S. application Ser. No. 221,653, filed Aug. 29, 1962, for a Monopulse Receiver now issued as U.S. Pat. 3,740,750. A disadvantage of the AGC type normalization technique is the resultant adverse transient performance due to the limited dynamic response and limited bandwidth of the closed loop AGC elements. Although such limitations may be avoided by open-loop logarithmic amplifier stages, such logarithmic techniques have demonstrated yet another limitation or disadvantage. Such disadvantage arises from the fact that the practice of such logarithmic technique has involved the envelope detection and video combining of the video detected logarithmic receiver signals, and does not employ the phase information inherent in the microwave outputs of the monopulse antenna. Accordingly, signal-gating of the normalized monopulse receiver output to avoid anomalous target angle signals (referred to hereinafter as beta-anomalies) may not be wholly successful due to anomalies introduced by such video-envelope signal processing.

SUMMARY OF THE INVENTION

By means of the concept of the subject invention, vector combination of logarithmic monopulse signals is employed, whereby the above-noted shortcomings of the prior art are avoided.

In a preferred embodiment of the invention, there is provided a monopulse system including an intermediate frequency stage providing target angle signal performance having reduced anomalies, and comprising a first and second intermediate frequency signalling channel providing a respective first and second signal indicative of the respective logarithmic vector sum and difference of a monopulse sum and difference signal, which signals are subjected to video detection and further processing.

By means of the cooperation of the above described arrangement, a bipolar beta angle signal of improved linearity is obtained. Also, a first gating, or unipolar beta, signal and a second gating, or logarithmic vector sum, signal may be obtained for receiver output gating purposes. The second gating signal may be employed to prevent an output response to signals below a selected threshold of interest such as an antenna sidelobe response; while the first gating signal represents a unique (or single-valued) function of the monopulse ratio $\Delta/\Sigma$ for preventing a system output response to beat anomalies. Such combined signalling functions thus provide a monopulse system having improved linearity and reduced beta-anomalies. Although such improved linearity is useful in an off-boresight type monopulse application, the concept of the invention is equally useful in on-boresight type monopulse systems; because the phase information is utilized in generating such logarithmic vector sum and difference signals, improved null performance is obtained in the boresight region. Further, because closed loop AGC units are not employed for signal normalization, improved dynamic response to shorter pulsewidth signals (i.e., better range resolution) is obtainable. Accordingly, it is an object of the invention to provide an improved monopulse system.

It is another object of the invention to provide a monopulse system demonstrating reduced beta anomalies.

Still another object is to provide a logarithmic monopulse receiver combining the functions of signal-normalization and beta-anomaly gating.

These and further objects of the invention will become apparent from the following description, taken together with the accompanying drawings, in which:

BRIEF DESCRIPTION OF THE DRAWINGS

In the figures, like reference characters refer to like parts.

DESCRIPTION OF THE PREFERRED EMBODIMENTS

Figure 1:
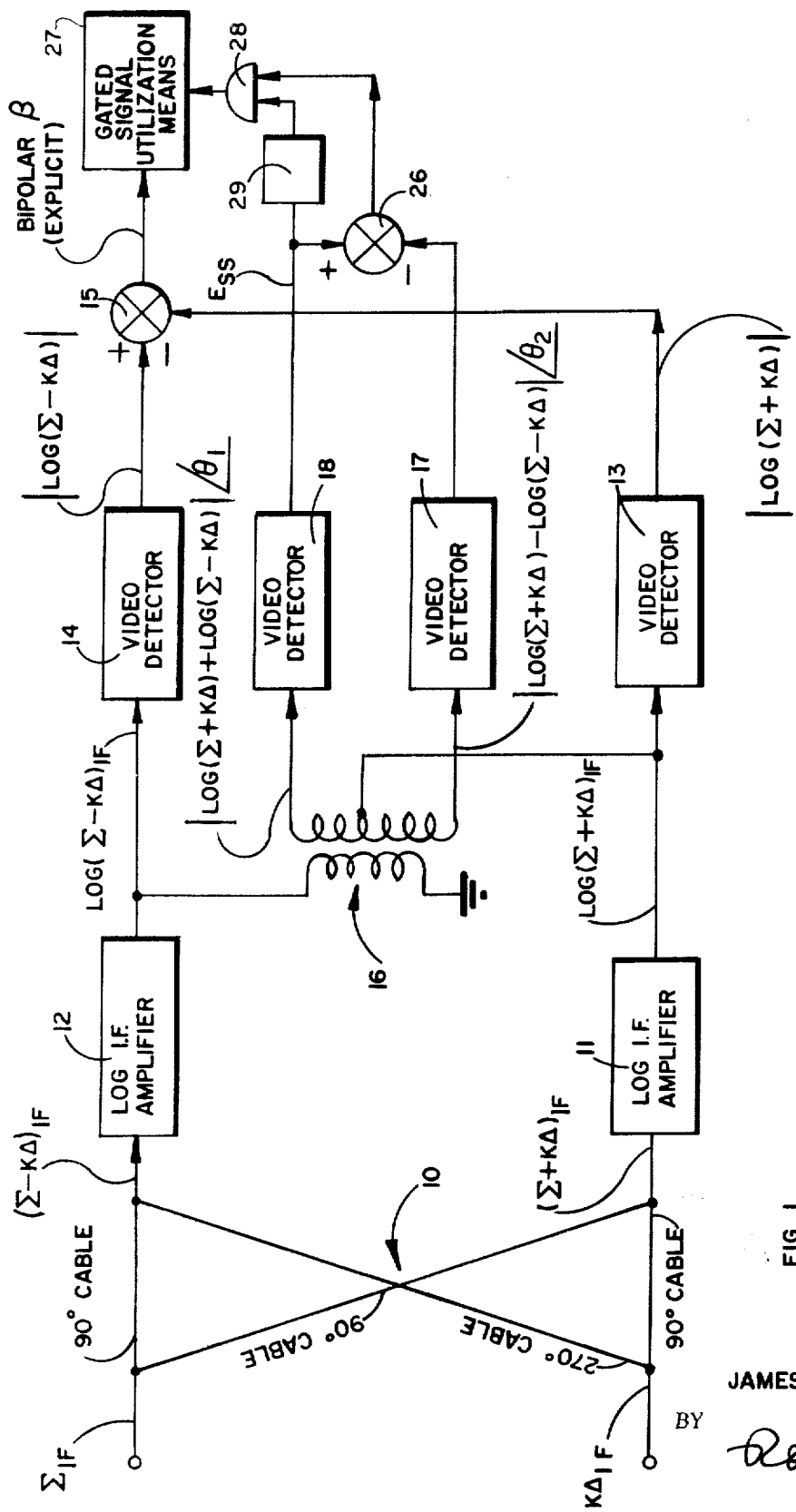
FIG. 1 is a functional block diagram of a system embodying the concept of the invention.

Referring to FIG. 1, there is illustrated a functional block diagram of a system embodying the concept of the invention. There is provided a four-terminal sum and difference IF network 10 responsively connected to the monopulse sum and difference outputs ($\Sigma_{IF}$ and $\Delta_{IF}$) of an intermediate frequency stage of a monopulse receiver (not shown), to provide a first IF signal ($\Sigma + K\Delta$) indicative of the sum of the inputs thereto, and a second IF signal ($\Sigma - K\Delta$) indicative of the difference between the inputs thereto. Such device may be comprised of a four-terminal hybrid transformer as employed in the telephone art, or may be comprised of a combination of 90° and 270° phase-shift cables, or other means well known in the art for providing a first and second IF output signal indicative of the sum and difference respectively of two IF input signals.

There is also provided a first and second logarithmic IF amplifier 11 and 12, each having an input coupled to a different one of the output terminals of network 10 for providing respective intermediate frequency outputs indicative of the logarithm of the respective inputs thereto. For example, first amplifier 11 is responsive to the sum ($\Sigma + K\Delta$)$_{IF}$ of an intermediate frequency monopulse sum ($\Sigma_{IF}$) and difference ($\Delta_{IF}$) signal for providing an IF output indicative of log ($\Sigma + K\Delta$); and second amplifier 12 is responsive to the difference ($\Sigma - K\Delta$)$_{IF}$ between such monopulse sum and difference signals for providing a second IF output indicative of log ($\Sigma - K\Delta$)$_{IF}$.

The IF outputs of each of amplifiers 11 and 12 may be video detected by respective detectors 13 and 14 and combined by video signal combining means 15 to provide a bipolar video signal explicitly indicative of the sense and amplitude of the angle-off-boresight ($\beta$) of a detected target. Where detectors 13 and 14 are oppositely poled unipolar conductive elements (such as oppositely poled diodes), then signal combining means 15 may be comprised of a simple summing impedance or network. An analytical treatment of the conceptual basis for so generating an explicit beta signal is developed more fully in the above-noted U.S. application Ser. No. 224,653 filed Aug. 29, 1962, now U.S. Pat. No. 3,740,750.

The intermediate frequency logarithmic amplifier employed for each of elements 11 and 12 in FIG. 1 is preferably of a plurality of cascaded non-linear IF amplifier stages, each non-linear stage having two mutually exclusive discrete gain states: a high-gain state for signals below a preselected signal level, and a lesser gain state for signals above such signal level. A detailed description of the utilization of such cascaded stages to effect IF logarithmic signal processing is to be found in the article "Logarithmic Amplifier Design," by S. J. Solms, published in the IRE Transactions, Vol. 1-8, December 1959. The detail design of such stages must include, of course, consideration for minimizing phase-tracking errors, as is understood in the art.

There is further provided, in FIG. 1, vector signal combining means 16 responsive to the two logarithmic intermediate frequency outputs of amplifiers 11 and 12 for providing a third intermediate frequency (IF) output |log ($\Sigma + \Delta$) – log ($\Sigma - \Delta$)|, indicative of the vector difference between the inputs to element 16, and further providing a fourth intermediate frequency output, $E_{ss} =$ |log ($\Sigma + \Delta$) + log ($\Sigma + \Delta$)|, indicative of the vector sum of the inputs to element 16. Such vector means 16 may be comprised of a 4-port hybrid transformer of the type described in U.S. Pat. No. 3,238,474, issued Mar. 1, 1966, to A. H. Kazakevicius, although an IF sum-and-difference amplifier may be alternatively employed. The envelope of each of the third and fourth IF outputs may be video detected by a respective one of third and fourth video detectors 17 and 18, for subsequent utilization as receiver gating signals, as will be explained more fully hereinafter.

Figure 2:
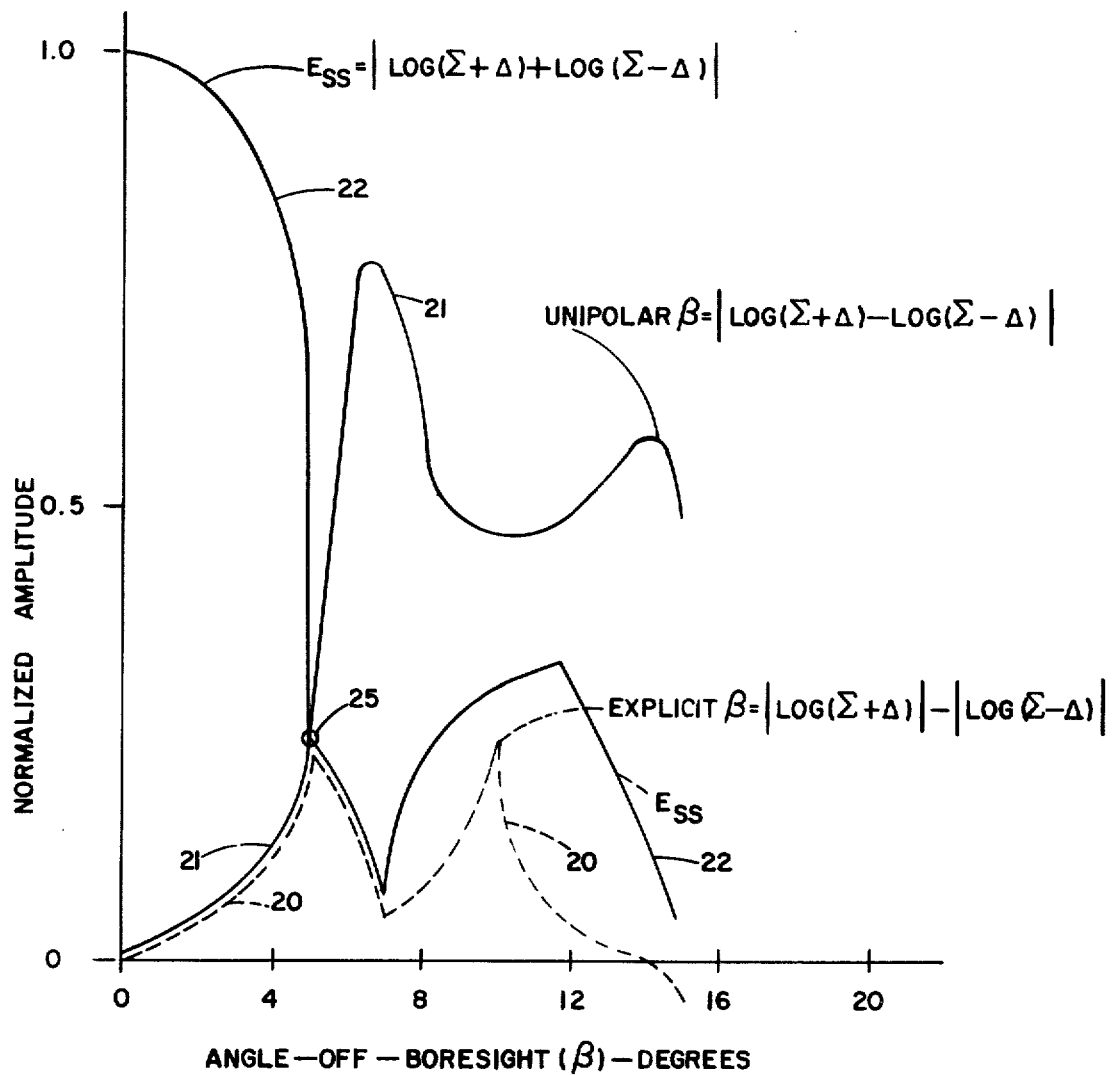
FIG. 2 is a family of curves of the signal amplitude response of certain elements of FIG. 1 as functions of angle-off-boresight, beta ($\beta$)
Figure 3:
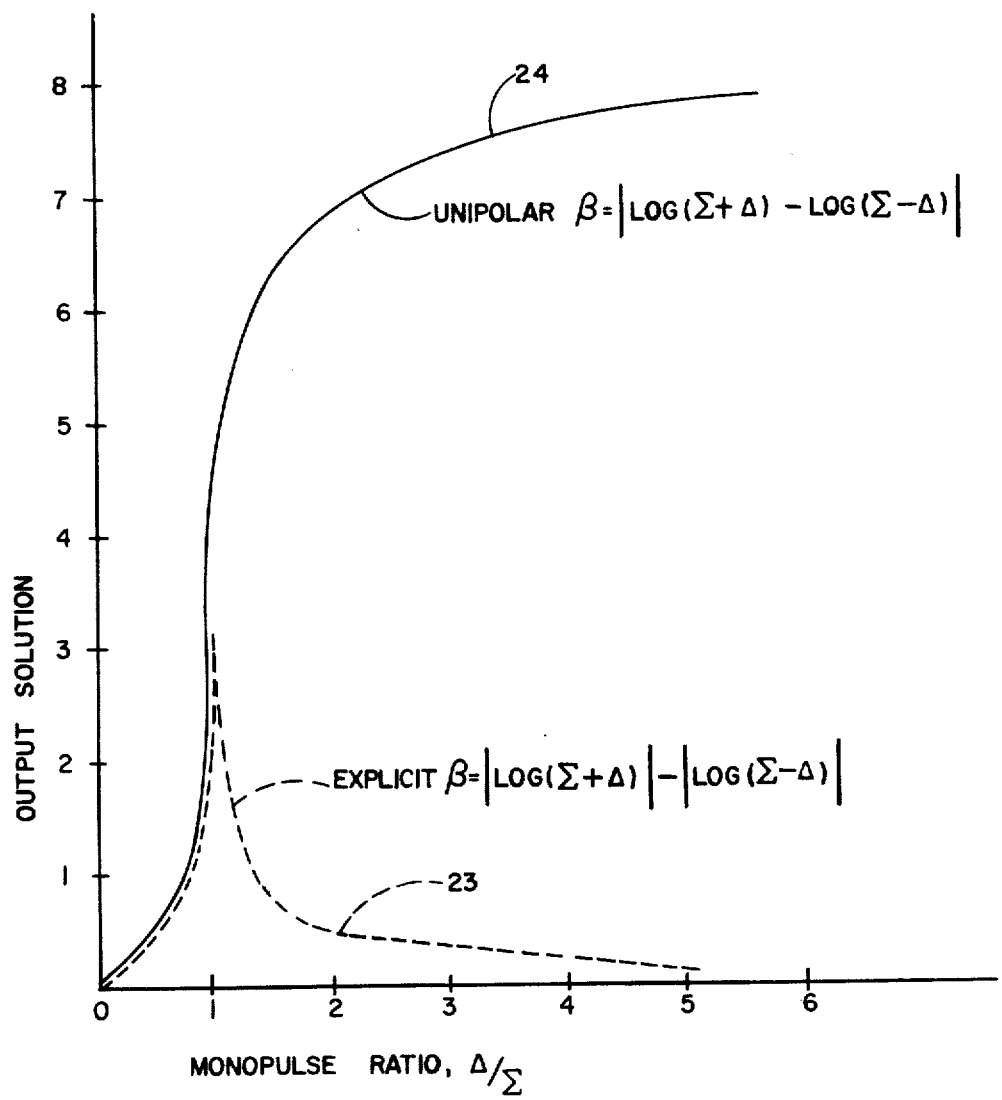
FIG. 3 is a family of curves of the signal amplitude of certain elements of FIG. 1 as functions of the monopulse ratio, $\Delta/\Sigma$.

Certain properties of the explicit-beta, unipolar beta and ESS signals are shown in FIGS. 2 and 3.

Referring to FIG. 2, there is illustrated a family of curves representing the detected envelope of certain responses of the arrangement of FIG. 1 as functions of target angle-off-boresight ($\beta$). Curves 20, 21 and 22 representing the respective envelopes of explicit beta, unipolar beta and $E_{ss}$ outputs of elements 15, 17 and 18, respectively (of FIG. 1). Within the main lobe response (Curve 22 between 0° and 5°), the explicit beta function (curve 20) is seen to be linear up to almost 4°

However, such explicit beta function is seen to be anomalous in that any value of curve 20 within the region between 0° and 4° may also be found in the region outside the mainlobe response (between 5° and 13½°). In other words, such function is not single-valued and the target angle cannot be determined from observation of the explicit beta signal alone.

It is to be further observed from FIG. 2 that outside the mainlobe response the $E_{ss}$ amplitude function (curve 22) is everywhere less than the main lobe $E_{ss}$ response, and is also less than the unipolar beta amplitude function (curve 21). Such latter relationships are obtained by employing both the phase and amplitude relationships of the IF logarithmic monopulse signals, in performing vector summing thereof prior to video detection, rather than processing an envelope-detected logarithmic monopulse signal.

The observed relationships, illustrated in FIG. 2, may be employed in logic gating means to prevent utilization of those receiver output signals occurring solely due to targets lying in those target angle regions outside the main lobe response and associated with a beta-anomaly.

The utility of the unipolar beta signal output of detector 17 for such gating purpose is to be seen from FIG. 3, in which the respective outputs of summing device 15 and detector 17 (of FIG. 1) as functions of the monopulse ratio ($\Delta/\Sigma$) are shown as curves 23 and 24, respectively. It is to be seen that no anomaly or ambiguity occurs in the function, unipolar beta versus $\Delta/\Sigma$ (curve 24), although the explicit beta function (curve 23) is anomalous. Hence, it is to be appreciated that an antenna design presenting no anomalies in the function $\Delta/\Sigma$ versus beta (angle-off-boresight) may advantageously cooperate with a receiver providing the anomaly-free unipolar beta signal output (of element 17 in FIG. 1), to assure overall system response to detected targets lying only within a preselected target angle region.

Because the unipolar beta signal amplitude (curve 21 in FIG. 2) crosses over the sum signal $E_{ss}$ (curve 22) only once (at point 25) as a function of the target angle magnitude (within the practical limits of the antenna response), such relationship may be used to limit the receiver output response to signals occurring within that portion of the antenna beamwidth represented by such crossover point (±5° in FIG. 2). In other words, the amplitudes of the outputs of detectors 17 and 18 (in FIG. 1) may be compared by a comparator 26 to provide a gating signal for control of means 27 for gating the utilization of bipolar explicit beta signal output of signal combining means 15. Additionally, the sum signal $E_{ss}$ may be threshold-tested (by means 29 well understood in the art) and combined at the input of a logic AND gate 28 with the gating signal output of comparator 26 for control of gated signal utilization means 27. In this way, the bipolar beta signal is not improperly utilized by means 27 in the absence of either or both of (1) a sum signal $E_{ss}$ in excess of a threshold value corresponding to a target of interest within the antenna main lobe response, and (2) a non-anomalous monopulse target condition.

Figure 4:
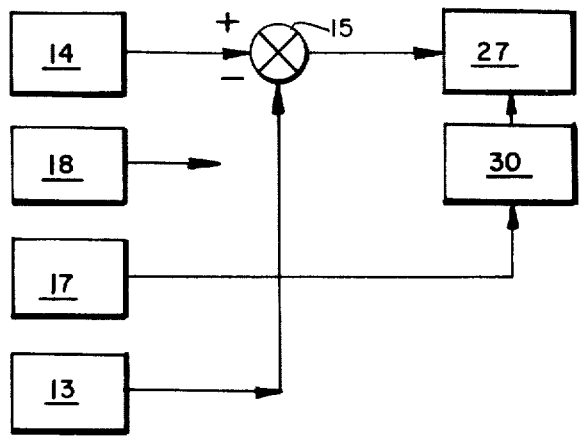
FIG. 4 is a schematic diagram illustrating means for thresholding the unipolar beta signal generated in the arrangement of FIG. 1.

Alternatively, the unipolar beta signal may be thresholded by threshold means 30, and such thresholded unipolar beta signal employed for control of signal gate 27, as shown in FIG. 4. It is to be appreciated (from a consideration of curves 21 and 22 in FIG. 2) that the normalized signal level corresponding to crossover point 25 may be represented by the threshold value selected for element 30, with which to test the unipolar beta signal output from detector 17. Where, however, it is intended to utilize only the linear response portion of curve 21 (as in an off-boresight processing application), then the threshold value may be reduced to an amount corresponding to the signal level of a target of interest, lying within the main lobe at that angular distance off the boresight representing such linear limits (about 3°, as illustrated in the example of FIG. 2).

Where, due to a possibility of targets of various types other than those of interest, it may be difficult, by means of the single threshold technique of FIG. 4, to distinguish a smaller target of no interest at a larger angle-off-boresight from a larger target of interest at a lesser angle-off-boresight. Accordingly, it may be desirable to include $E_{ss}$ thresholding in the arrangement of FIG. 4.

Figure 5:
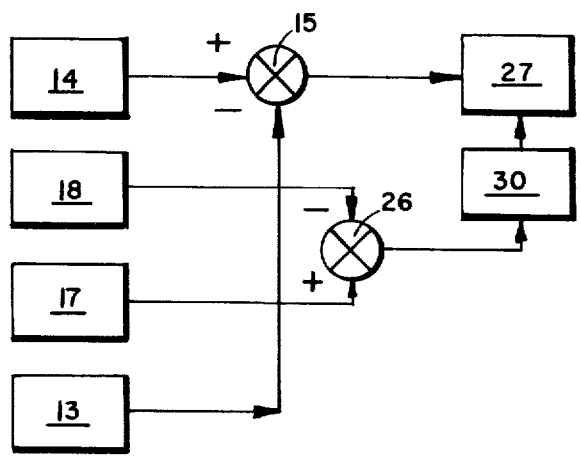
FIG. 5 is a preferred alternative to the thresholded arrangement of FIG. 4.

A preferred single threshold technique is shown in FIG. 5, by which the $E_{ss}$ signal is differentially combined with the unipolar beta signal at element 15, and the combined signal threshold-tested by threshold means 30, and the thresholded signal employed for gating control of gated signal utilization means 27. Such combining of the $E_{ss}$ signal with the unipolar beta signal has been found to remove the sensitivity of the gating control signal to system phase-tracking errors or system phase-shifts. Also, such thresholding of a combined unipolar beta and $E_{ss}$ signal combines the tests for (1) a target of significance (2) located outside of the beta anomaly region, and (3) within a preselected region of linear system response.

Although the gating arrangement of FIG. 1 has been described and illustrated in terms of limiting the bipolar beta angle signal response of a monopulse receiver, it is clear that the derived gating signals may also be used to gate the monopulse sum signal, normally employed by a display indicator. Also, although the derivation of such gating signals have been described and illustrated in terms of utilization in a monopulse receiver-processor of the "off-boresight" type, utilization of such technique is not so limited, the technique being adapted for use in "on-boresight" type monopulse systems as shown in FIG. 6.

Figure 6:
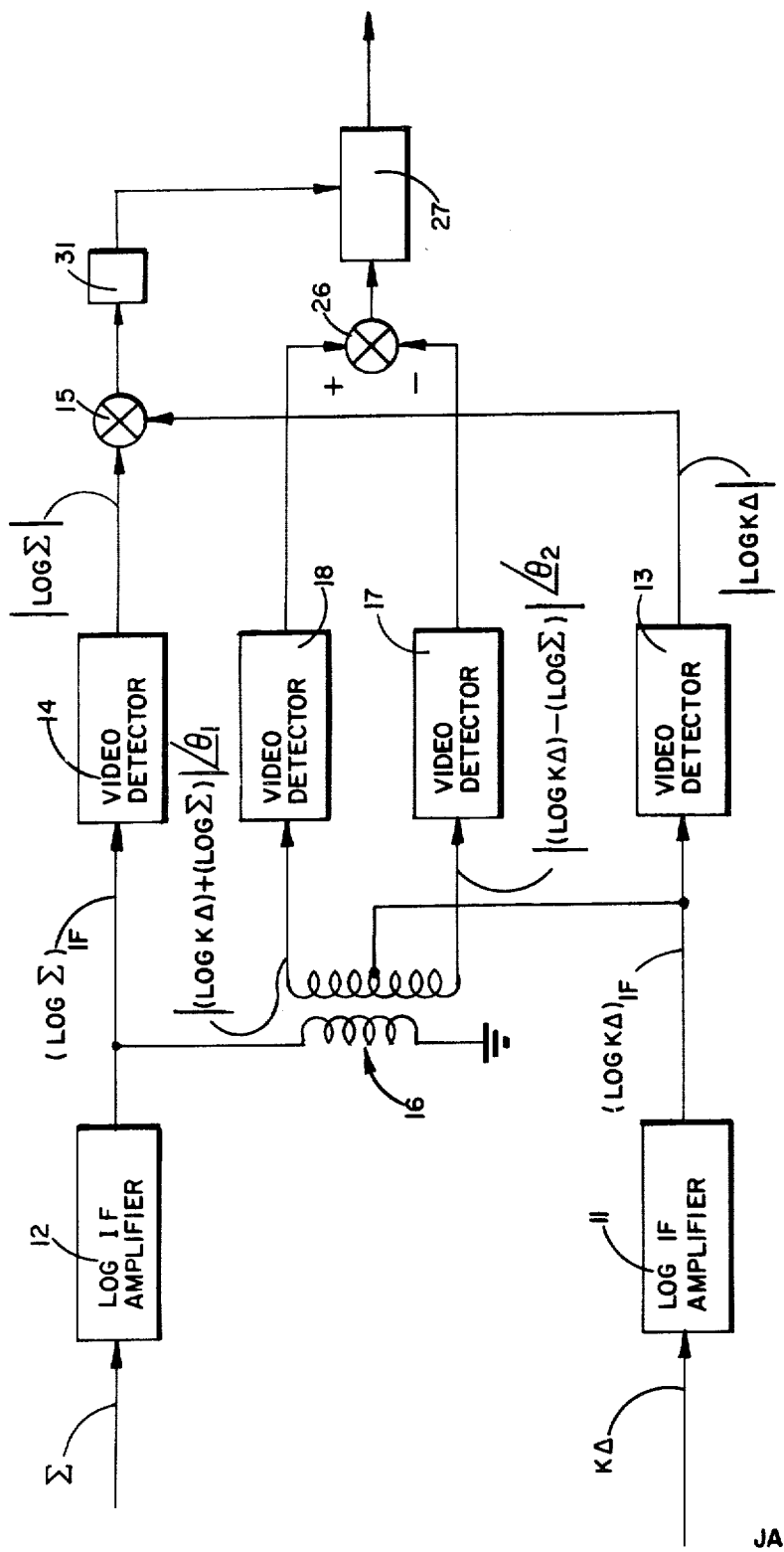
FIG. 6 is a block diagram illustrating a further aspect of the inventive concept.

Referring to FIG. 6, there is shown a monopulse system of the on-boresight type, employing logarithmic normalization and illustrating another aspect of the inventive concept. Instead of matrixing the $\Sigma$ and $\Delta$ signals to obtain ($\Sigma + \Delta$) and ($\Sigma - \Delta$) prior to logarithmic IF processing (as in FIG. 1), the $\Sigma_{IF}$ and $\Delta_{IF}$ signals are directly applied to a respective one of logarithmic IF amplifiers 11 and 12. The resultant IF log $\Delta$ signal is then phase detected, using the IF log $\Sigma$ signal as a phase reference.

Figure 7:
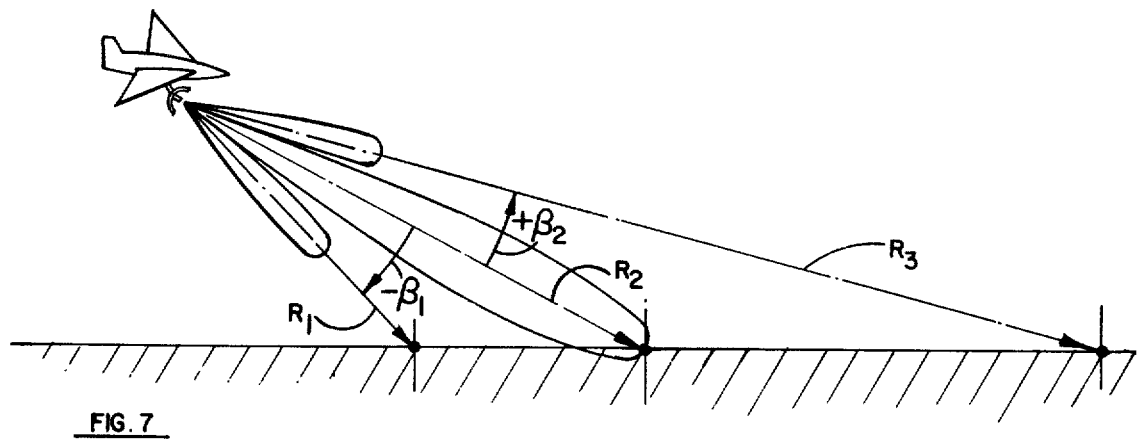
FIG. 7 is an illustration of the geometry of a situation in which the concept of the invention may be advantageously employed.

The use of comparator 26 as a phase-detector or indicator in the system of FIG. 6 arises from the utilization of such on-boresight system in an airborne terrain-following application. In such application, a pencil beam antenna is directed at a slight depression angle toward terrain below and ahead of a utilizing vehicle, as shown in FIG. 7. The slant range to the terrain (measured along the antenna boresight) is indicative of the terrain clearance distance, perpendicular to the vehicle flight path. At a preselected depression angle, a preselected-on-boresight slant range, $R_2$, corresponds to a preselected perpendicular clearance distance, a lesser slant range value corresponding to a lesser clearance or a warning condition.

Figure 8:
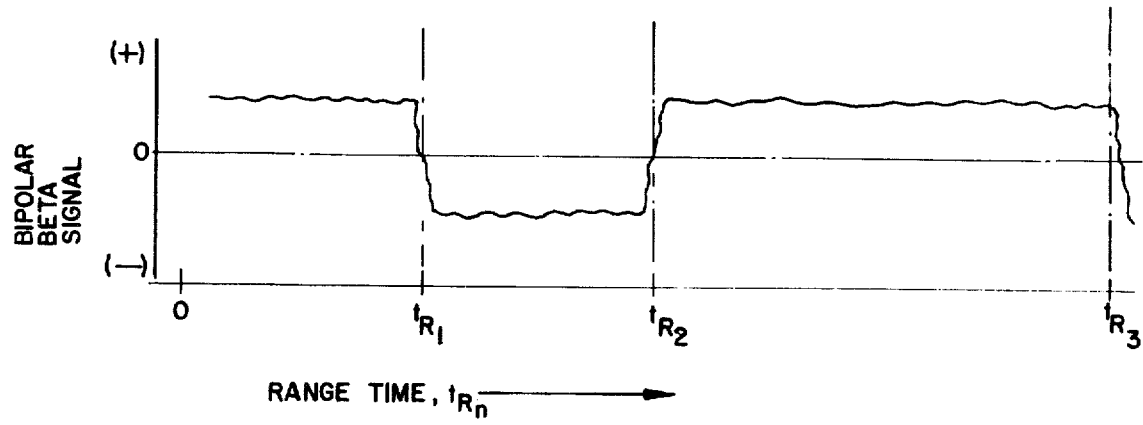
FIG. 8 is a representative time history of an exemplary response of a system embodying the inventive concept and utilized in the situation depicted in FIG. 7.

The determination of such on-boresight slant range involves the gating of signals received from terrain features off-boresight. However, the performance of such gating involves, in turn, avoiding monopulse anomalies. For example, as the vehicle in FIG. 7 approaches a distant terrain point (at initial range distance $R_3$), the sense of the associated target angle $\beta_2$ is initially positive, the magnitude of the positive angle progressively decreasing to zero, reversing sense and progressively increasing with reversed sense ($-\beta_1$ at $R_1$). The range trace monopulse difference signal provided by the radar system for a given pulse repetition interval (and shown in FIG. 8), indicates first the early return from close-in terrain features lying below the boresight axis of FIG. 7, and then the later return of distant terrain features viewed above the boresight axis, the phase sense of the monopulse difference signal changing sense at that range time ($t_{R_2}$ in FIG. 8) corresponding to the range distance at which a portion of the terrain profile is on-boresight. Accordingly, a gating signal, indicative of the time of occurrence of such change of sense, may (in the absence of monpulse anomalies) be employed to indicate such on-boresight conditions. However, where anomalous nulls exist in the monopulse difference signal response for target angle conditions other than on-boresight, (say, at $t_{R_1}$ and $t_{R_3}$ in FIG. 8), then logic gating is required to prevent system response to such anomalies, as shown in FIG. 6. Such gating may include threshold testing of the monopulse sum signal by means of element 31. Testing may also be conducted upon the bipolar monopulse difference signal to determine the sense of the rate of change thereof at a crossover.

Accordingly, there has been disclosed intermediate frequency means for logarithmic normalization of monopulse signals, whereby improved linearity and null performance may be obtained. Such improved signalling quality may be employed to reduce system response to monopulse anomalies in both on-boresight and off-boresight type monopulse data processors.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A monopulse system including an intermediate frequency stage providing target angle signal performance having reduced anomalies, and comprising a first and second intermediate frequency signalling channels providing a respective first and second signal indicative of the respective logarithmic vector sum and difference of a monopulse sum and difference signal, each said channels comprising intermediate frequency vector combining means responsive to said monopulse sum and difference signals; and logarithmic signalling means responsive to the output of said vector combining means.

2. A monopulse receiver including an intermediate frequency stage and comprising a first and a second intermediate frequency signalling device for providing respective intermediate frequency outputs indicative of the logarithm of the respective inputs thereto, said first signalling device responsive to the sum of intermediate frequency monopulse sum and difference signals and said second signalling device being responsive to the difference between said intermediate frequency monopulse sum and difference signals;

vector signal combining means responsive to said logarithmic intermediate frequency outputs for providing a third intermediate frequency output indicative of the vector difference between the inputs thereto and further providing a fourth intermediate frequency output indicative of the vector sum of the inputs thereto;

bipolar signalling means responsive to the envelope difference between said first and second intermediate frequency outputs for providing a bipolar signal indicative of the sense and amplitude of the angle-off-boresight of a detected target;

gating means responsive to at least one of said third and fourth intermediate frequency outputs for gating said bipolar signal.

3. The device of claim 2 in which said gating means comprises comparator means responsive to the amplitudes of said third and fourth intermediate frequency outputs for indicating the amplitude difference therebetween; and a signal gate for gating said bipolar signal and having a gating control input responsively coupled to said comparator and to said fourth output of said vector signal combining means.

4. The device of claim 2 in which said gating means comprises threshold means for threshold testing the amplitude of said fourth output of said vector signal combining means; and signal gating means responsive to an output of said threshold means and to one of the third intermediate frequency output amplitude and the amplitude difference between said third and fourth intermediate frequency outputs for gating said bipolar signal.

5. The device of claim 2 in which said gating means includes means for gating said bipolar signal in the absence of either a fourth intermediate frequency output of a preselected amplitude or a third intermediate frequency output having at least a preselected amplitude ratio relative to said fourth intermediate frequency output.

6. A monopulse receiver having an on-boresight mode and including an intermediate frequency stage and comprising a first and a second intermediate frequency signalling device for providing respective intermediate frequency outputs indicative of the logarithm of the respective inputs thereto, said first signalling device being responsive to an intermediate frequency monopulse sum signal, and said second signalling device being responsive to an intermediate frequency monopulse difference signal;

vector signal combining means responsive to said logarithmic intermediate frequency outputs for providing a third intermediate frequency output indicative of the vector difference between the inputs thereto and further providing a fourth intermediate frequency output indicative of the vector sum of the inputs thereto;

gating means response to the amplitude of the difference between said third and fourth intermediate frequency outputs for gating preselected ones of said outputs.

* * * * *